United States Patent [19]

Topolski

[11] Patent Number: 4,731,216
[45] Date of Patent: Mar. 15, 1988

[54] PROCESS FOR MANUFACTURING A SEAMLESS LAMINAR ARTICLE

[75] Inventor: Alvin S. Topolski, Wilmington, Del.

[73] Assignee: E. I. Du Pont de Nemours and Company, Wilmington, Del.

[21] Appl. No.: 845,736

[22] Filed: Mar. 28, 1986

Related U.S. Application Data

[62] Division of Ser. No. 739,034, May 29, 1985.

[51] Int. Cl.[4] .............................................. B29C 49/04
[52] U.S. Cl. .................................... 264/503; 264/515; 264/540; 264/173; 425/523; 425/532; 425/380; 425/381
[58] Field of Search ............... 264/514, 515, 503, 173, 264/108, 540; 425/131.1, 133.1, 461, 466, 467, 381, 523, 380, 532; 156/244.15

[56] References Cited

U.S. PATENT DOCUMENTS

| 3,099,860 | 8/1963 | Schippers | 425/380 |
| 3,256,560 | 6/1966 | Adomaitus | 264/108 |
| 3,279,501 | 10/1966 | Donald | 138/118 |
| 3,404,203 | 10/1968 | Donald | 264/108 |
| 3,493,997 | 2/1970 | Albert et al. | 425/133.1 |
| 3,558,755 | 1/1971 | Laban et al. | 264/514 |
| 3,565,985 | 2/1971 | Schrenk et al. | 264/515 |
| 3,716,612 | 2/1973 | Schrenk et al. | 264/312 |
| 4,059,373 | 11/1977 | Maier | 425/467 |
| 4,063,865 | 12/1977 | Becker | 425/467 |
| 4,182,603 | 1/1980 | Knittel | 425/133.1 |
| 4,265,693 | 5/1981 | Nishimoto et al. | 264/515 |
| 4,305,902 | 12/1981 | Uhlig | 425/378 R |
| 4,410,482 | 10/1983 | Subramanian | 264/515 |
| 4,416,942 | 11/1983 | DiLuccio | 428/332 |
| 4,444,817 | 4/1984 | Subramanian | 428/36 |
| 4,472,129 | 9/1984 | Siard | 425/381 |

FOREIGN PATENT DOCUMENTS

| 716987 | 8/1965 | Canada | 264/503 |
| 0015556 | 9/1980 | European Pat. Off. | |
| 0044616 | 1/1982 | European Pat. Off. | |
| 1599591 | 1/1978 | United Kingdom | |

Primary Examiner—Jeffery Thurlow

[57] ABSTRACT

Seamless, molded, thermoplastic articles having a laminar, multi-component composition with a heterogeneous blend of incompatible polymers—at least one as a matrix and at least one as a discontinuous phase, are manufactured by (1) heating the blend above the melting point of the highest melting polymer component, and (2) molding the melted blend to have a knit line curved through the thickness of the article resulting from such molding.

9 Claims, 6 Drawing Figures

PROCESS FOR MANUFACTURING A SEAMLESS LAMINAR ARTICLE

This is a division of application Ser. No. 739,034, filed May 29, 1985.

BACKGROUND OF THE INVENTION

1. Field of the Invention

This invention relates to thermoplastic articles molded from a heterogeneous blend of incompatible polymers. Especially preferred polymers are a polyolefin first polymer and a second polymer, incompatible with the polyolefin. The invention, additionally, relates to processes for making such articles. The invention specifically relates to such articles having substantially uniform wall thicknesses around the circumference of a generally cylindrical shape with resulting improved barrier properties and strength.

2. Description of Prior Art

U.S. Pat. No. 4,410,482 discloses manufacture of thermoplastic articles from a heterogeneous blend of a polyolefin first polymer and an incompatible second polymer. The articles of that patent have the polymer components present as a multitude of thin, substantially two-dimensional, parallel and overlapping layers and such articles in the form of containers are disclosed to exhibit permeation barrier characteristics greatly increased in comparison with containers made from polyolefin, alone. Other patents which disclose articles having a similar construction include U.S. Pat. Nos. 4,444,817 and 4,416,942.

U.S. Pat. No. 3,099,860 discloses an extrusion device for making tubing of homogeneous wall construction whereby molten molding material is conducted through the device by streamlining support fins to reduce the existence of flow lines caused by separation of the material in the so-called nozzle head. This patent also discloses a steplike offset of the support to assure effective mixing of the molten material.

U.S. Pat. Nos. 3,279,501 and 3,404,203 disclose manufacture of tubing with oriented internal and external surfaces wherein the mold surfaces are counter-rotated during extrusion of the molten material.

U.S. Pat. No. 3,256,560 discloses a die for orienting the internal and external surfaces of an extrudate by means of grooves cut in the respective surfaces of the die to direct the flow of molten material in opposite directions.

SUMMARY OF THE INVENTION

According to this invention there is provided a process for manufacturing a laminar, molded, hollow, article of polymeric material comprising the steps of establishing a molten, heterogeneous, blend of incompatible polymers by heating the blend above the melting point of the highest melting polymer component and, then, molding the melted blend by extruding a body of the blend through a die wherein internal surfaces of the die have streamlined irregularities positioned to displace surface material of the blend relative to core material of the blend and cooling the extruded body to below the melting point of the lowest melting polymer component. In a preferred, continuous, blow molding process of this invention, the extruded body is blown before cooling. The blend of incompatible polymers preferred and most often used includes a polyolefin as a continuous or matrix phase and a second polymer incompatible with the polyolefin as a discontinuous or distributed phase.

A laminar, molded, hollow article is also provided which comprises a combination of incompatible polymers wherein the polymers are present as thin, substantially two-dimensional, parallel and overlapping layers of material and wherein melt seams or knit lines in the article are curved to provide such overlapping layers in any radial section through a wall of the hollow article. Such laminar hollow article, when blow molded, has overlapping layers in any radial section and has walls of substantially uniform thickness around the perimeter or circumference of the article.

An important and critical aspect of the present invention resides in the displacement of surface material during manufacture of articles molded using the heterogeneous blend such that, when the blend is stretched, all components of the blend remain relatively uniformly distributed throughout the article and the thickness of the article does not undergo thinning at one area out of proportion with other areas of the article.

BRIEF DESCRIPTON OF THE DRAWINGS

DESCRIPTION OF THE INVENTION

Laminar, shaped, articles are well known which are made from a mixture of incompatible polymers wherein one polymer is in the form of a continuous matrix phase and another polymer is in the form of a discontinuous distributed phase. The laminar articles are made by mixing together particles of the polymers, heating the mixture to yield a heterogeneous melt of material, and forming the melt in a way which results in stretching the melt to yield an elongated discontinuous polymer phase.

In one embodiment, the polymer particles, in unmelted form, are mixed thoroughly so as to provide a statistically homogeneous distribution and care is exercised to avoid substantial additional mixing after the polymers have been heated to a melt. In another embodiment, the polymer particles can be combined in softened or molten form so long as the combination of polymers maintains a heterogeneous character. The blend can, also, be established by combining the polymers such that the highest melting of the polymers is not softened or molten and then heating the combination. The success of the invention depends on establishing a melted heterogeneous blend of incompatible polymers so that, when the melt is stretched, such as by blow molding forces, one polymer is in the form of a continuous matrix phase and another polymer is in the form, of a discontinuous distributed phase. The polymer comprising the discontinuous phase is present as a multitude of thin, substantially two-dimensional, parallel and overlapping layers embedded in the continuous phase.

The thin, substantially two-dimensional, parallel and overlapping layers operate, in concert, to provide strength and permeation barrier qualities to the article so-formed. To the extent that the layers overlap, the strength and the barrier qualities are enhanced by providing a bridge of discontinuous material across the matrix phase.

The strengthening effect of overlapped layers is especially pronounced in the manufacture of laminar articles by blow molding means although the effect is, also, exhibited when the laminar articles are made by other means, such as by the stretching forces which are associated with simple extrusion.

In blow molding manufacture of laminar articles, such as in blow molding bottles, a parison is generally made and then the parison is blown to a final bottle shape. Parisons are manufactured by extrusion from dies which form tubing and such does must be constructed with support elements or material flow components which divide the molten material as it flows to the die lip opening. In the laminar, heterogeneous, article of the present invention, any division of the molten material prevents overlap of layers in the distributed phase at the points of division and causes weakening of the article unless the overlap can somehow be reinstituted.

Figure 1:
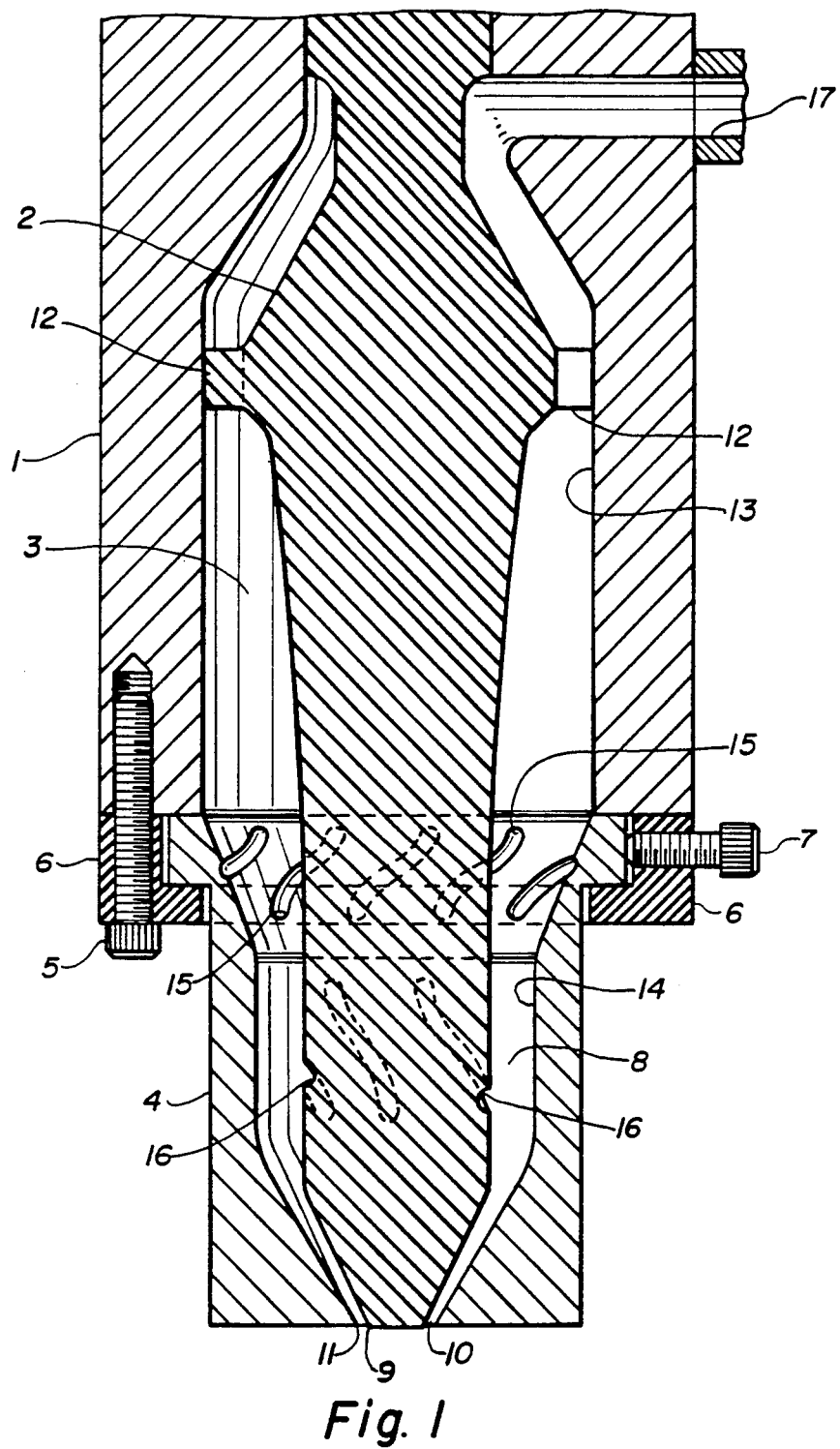
FIG. 1 is a cross-sectional representation of an extrusion device with a grooved spiral head useful for practicing the present invention.
Figure 2:
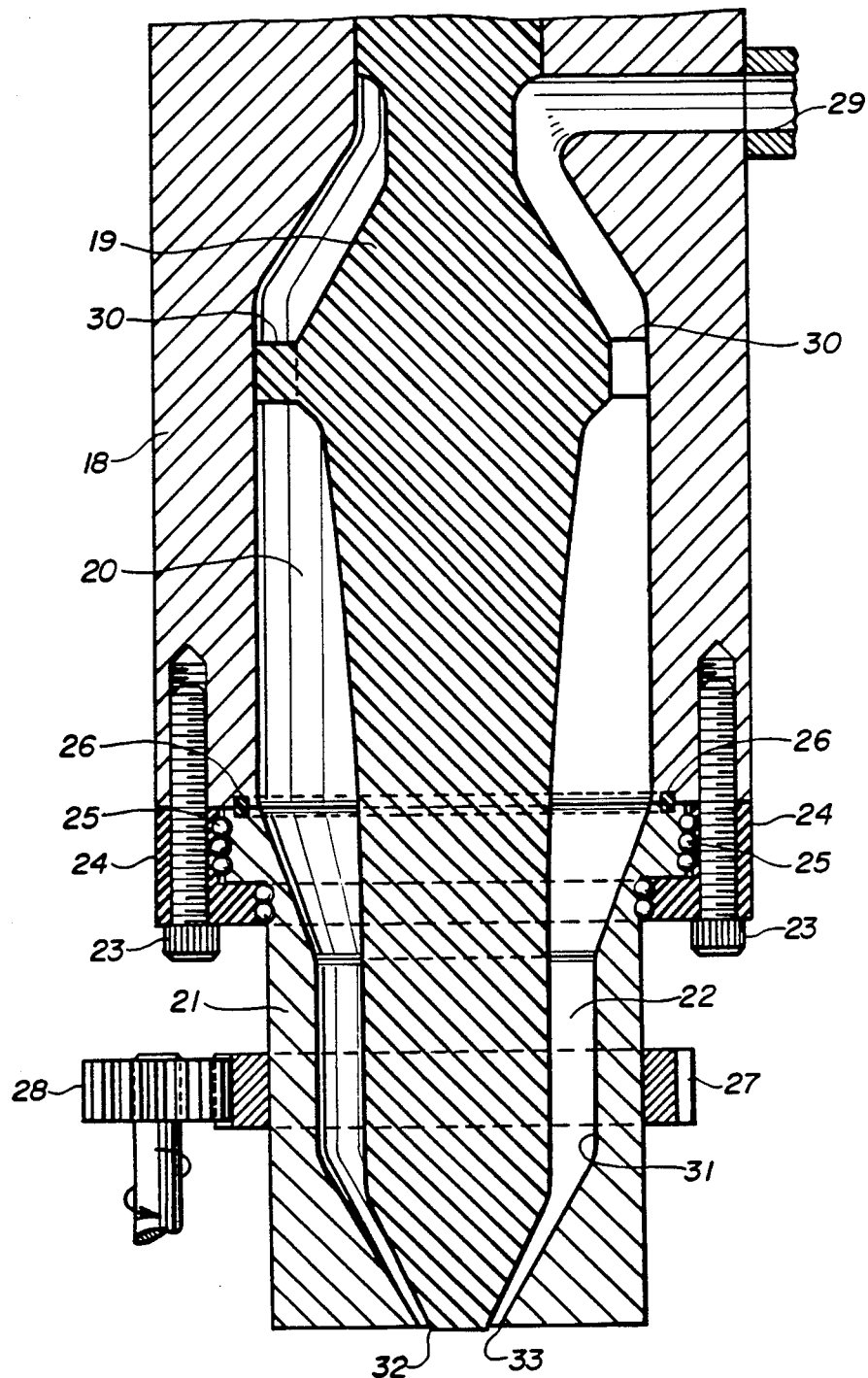
FIG. 2 is a cross-sectional representation of an extrusion device with a rotating extrusion head useful for practicing the present invention.

FIG. 1 depicts an extrusion device with a body 1 and a mandrel 2 centrally positioned within a cavity 3 in body 1. Outer die lip element 4 is affixed to body 1 by means of bolts 5 and ring 6 and its position is adjusted by means of bolts 7. Outer die lip element 4 includes a cavity 8 in which mandrel 2 is also centrally positioned. Mandrel 2 ends in an inner die lip surface 9 at the point where mandrel 2 is in closest proximity with exit 10 from outer die lip element 4 to form outer die lip surface 11. Mandrel 2, centrally located in cavities 3 and 8, are supported by spiders 12 which are rigid struts from about two to twelve in number arranged equidistant from each other fixed between mandrel 2 and the inner wall 13 of body 1. In FIG. 1, two of the spiders 12 are shown. One spider 12 is shown in cross section as a part of mandrel 2 and another spider 12 is shown as it radiates from mandrel 2 into the plane of the figure to body 1. Extrusion devices such as are depicted in FIG. 1 and in FIG. 2 are often used without spiders but are shown here to afford the added stability provided thereby.

The inner wall 14 of outer die lip element 4 has grooves 15 which serve as streamlined irregularities for spirally displacing molten material passing through the device. The mandrel 2 may have grooves 16 which, also, serve as streamlined irregularities for spirally displacing molten material. Grooves 15 and 16 are, generally, located with opposite spirals.

In operation, a molten, heterogeneous, blend of incompatible polymers is introduced into the extrusion device through inlet port 17 and around mandrel 2. The molten material passes around both sides of mandrel 2 and where the material meets itself on the side opposite the inlet port 17, a knit line is formed. The knit line is so-called because the molten material must knit together and form a weld or joint in the final molded article. Without the benefit of the present invention, the continuous or matrix phase of the heterogeneous blend of polymers can be successfully knit together; but the discontinuous or distributed phase cannot form an adequate joint because the parallel layers of distributed material cannot overlap across the knit line.

The molten blend, complete with knit line, continues into cavity 3 and passes spiders 12 whereupon the blend is cut by each of the spiders 12. At each cut, the molten material is separated; and, after each spider, the molten material is rejoined with itself and results in a melt seam wherein the continuous or matrix phase is successfully joined but the distributed phase is not overlapped across the seam.

The molten blend, with knit line and melt seams, advances through cavity 3 and into cavity 8. For purposes of describing this invention, knit lines and melt seams are equivalent and either designation can be taken to mean both. At cavity 8, the molten blend encounters streamlined irregularities in the form of grooves 15 in outer die lip element 4 and grooves 16 in mandrel 2. The grooves 15 and 16 are spirally placed in opposing directions on outer die lip element 4 and mandrel 2, respectively, and the grooves cause gentle displacement of surface layers of the molten material such that the melt seams are curved and particles of the distributed phase are overlapped in the sense that such particles are present in any radial section through the molten material.

The molten blend, with displaced surface layers, is extruded between inner die lip surface 9 and outer die lip surface 11 to yield a shaped article having curved knit lines and overlapping particles of the distributed phase. It should be noted that the benefits of this invention can be realized even if the streamlined irregularities are present on only one surface of the extrusion device, for example, on only the outer die lip element 4 or on only the mandrel 2. Moreover, the streamlined irregularities can be located, generally, on any surface of cavity 3 or cavity 8 so long as they are downstream from the spiders 12 and they can take the form of either grooves or ridges.

The grooves or ridges—the streamlined irregularities—should be shaped such that the irregularities cause displacement of less than about one-third of the thickness of the molten material on the affected side and the displacement should be gentle in that the displaced material is maintained in its heterogeneous condition and is not mixed excessively, causing homogenization of the displaced blend.

FIG. 2 depicts an alternative embodiment of an extrusion device useful in practice of this invention. The device comprises body 18 and mandrel 19 with cavity 20 in body 18. In this device, outer die lip element 21 is rotatably mounted against body 18 such that cavity 20 matches with cavity 22 in outer die lip element 21. Outer die lip element 21 is held against body 18 by means of bolts 23 and ring 24 and rotatability is maintained by bearings 25. Seal 26 is provided to prevent leakage of molten molding material. Outer die lip element 21 has ring gear 27 mounted thereon and it is rotated by driving gear 28. A molten, heterogeneous, blend of incompatible polymers is introduced at inlet port 29, forms a knit line at mandrel 19, and traverses the cavities 20 and 22 being separated during its travels by spiders 30 and then rejoined. In FIG. 2, two of the spiders 30 are shown. One spider 30 is shown in cross section as a part of mandrel 19 and another spider 30 is shown as it radiates from mandrel 19 into the plane of the figure to body 18. Outer die lip element 21 is rotated and the rotation causes shear forces between the inner surface 31 of outer die lip element 21 and the molten blend. In this case, the streamlined irregularities can be as small as the slight irregularities usually found on machined surfaces or they can be more pronounced grooves or ridges placed on the inner surface 31. Rotation of the outer die lip element 21 intensifies the effect of the irregularities. The rotation of the outer die lip element 21 causes displacement of a surface layer of the molten material resulting in curved knit lines and melt seams and in overlapping of particles of the dispersed phase in the shaped article which is extruded between inner die lip surface 32 and outer die lip surface 33.

Figure 3:
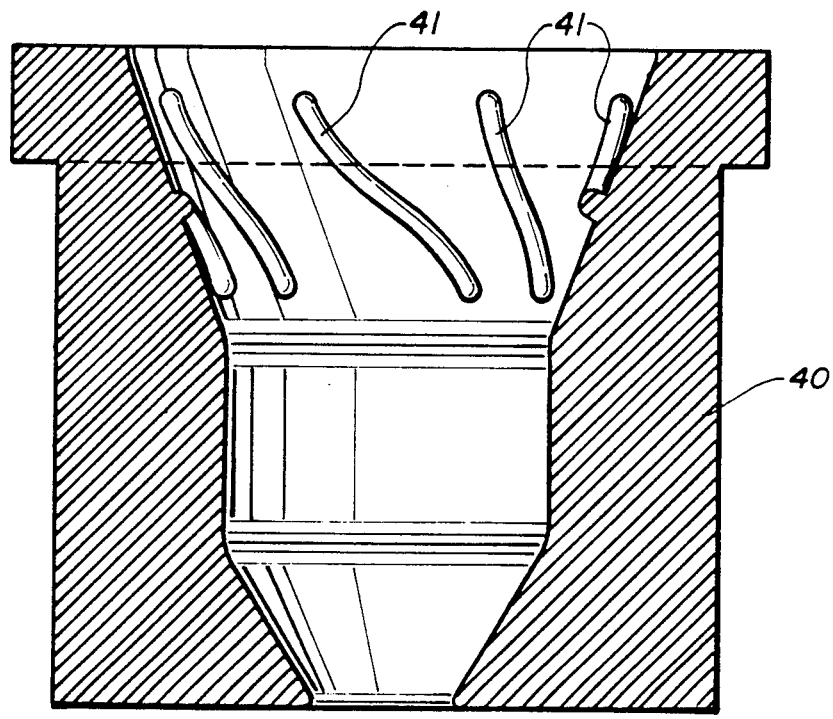
FIG. 3 is a cross-sectional representation of a ribbed spiral head to be used in an extrusion device for practice of the present invention.

FIG. 3 depicts an outer die lip element 40 which can be used in the extrusion devices of FIG. 1 and, if fitted with a ring gear, FIG. 2. The element 40 of FIG. 3 is fitted with ridges 41 as streamlined irregularities.

Figure 4:
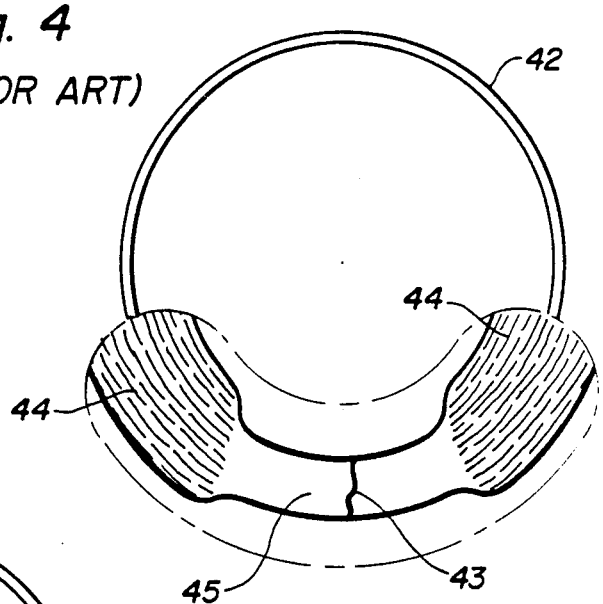
FIG. 4 is a cross-sectional representation of a blow molded lamellar container wall of the prior art displaying a greatly magnified melt seam volume.

FIG. 4 depicts a cross section of laminar, molded, hollow article 42 of a molten, heterogeneous, blend of incompatible polymers after the article has undergone stretching. The FIG. 4 depicts a stretched laminar, molded, article made without the benefit of the present invention. An inset is drawn to show an exaggerated representation of a knit line or melt seam 43 in the hollow article 42. Particles of polymeric material 44, shown as thin, substantially two-dimensional, parallel and overlapping layers are distributed in continuous, matrix, material 45. Before stretching, article 42 has a substantially constant thickness all around its circumference. At knit line 43, matrix material 45 is thoroughly fused to yield a successful melt seam of the matrix material; but there is no overlap of particles of polymeric material 44 across knit line or melt seam 43.

Particles of polymeric material 44 lend strength and reinforcement to the blend; and, when the article (or tube or bottle) is stretched there will be less stretching in a section or volume which contains the particles 44 than there will be in a section or volume which has none of the particles 44. The portion of the article directly surrounding knit line 43 has no overlapping particles of polymeric material 44 and, therefore, is subjected to more stretching than the portion of the article farther away from the knit line. By being stretched more, the resulting article wall is thinner and the product develops a thin, weak, area which follows the knit line and the seams all along the wall of the article.

Figure 5:
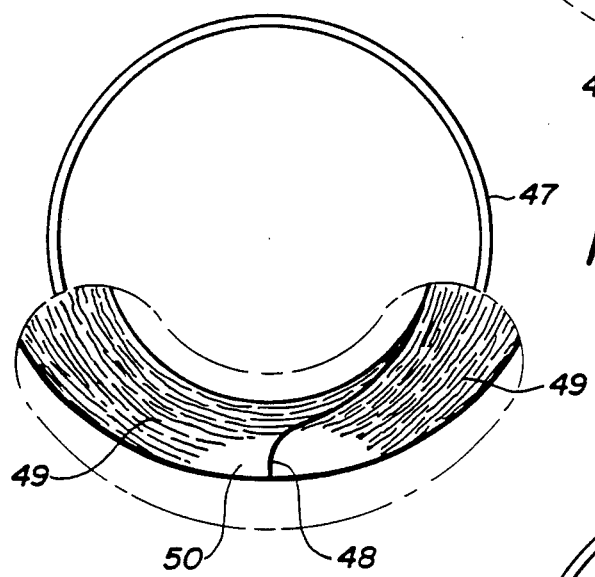
FIG. 5 is a cross-sectional representation of a blow molded lamellar container wall of the present invention having one wall surface displaced and displaying a greatly magnified melt seam volume.
Figure 6:
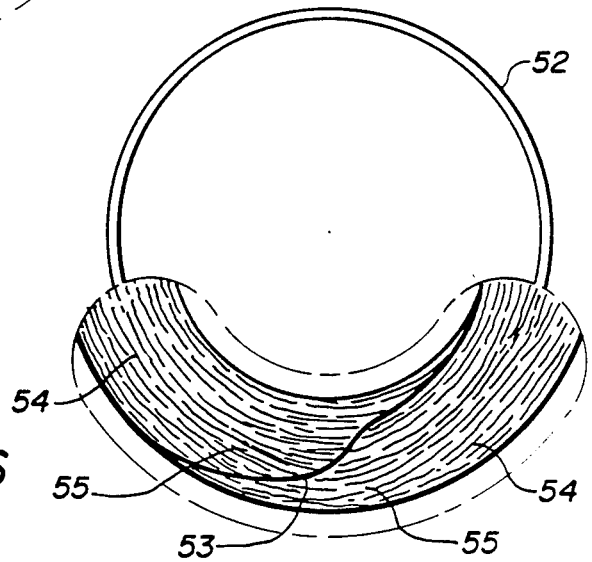
FIG. 6 is a cross-sectional representation of a blow molded lamellar container wall of the present invention having two wall surfaces displaced and displaying a greatly magnified melt seam volume.

The distributed particle 44, in FIG. 4, and 49 and 54 in FIGS. 5 and 6, respectively, are depicted as having a length on the order of the thickness of the article itself. While determination of the length of the particles 44 is very difficult and while the lengths are expected to vary considerably from one particle to another, it is believed that the particles actually have a length of about 5 to 50 and most usually 10 to 30 times the thickness of an article such as is presented in FIGS. 4, 5, and 6. The particles 44 are shown out of scale for the purpose of providing an accurate impression of the large number of two-dimensional, parallel and overlapping, layers present in the article of this invention.

FIG. 5 depicts a cross section of a laminar, molded, hollow article 47 of a molten, heterogeneous, blend of incompatible polymers after the article has undergone stretching. The article of FIG. 5 is an article of the present invention. An inset is drawn to show an exaggerated representation of a knit line or melt seam 48 in the article 47. As in FIG. 4, particles of polymeric material 49 are shown distributed in continuous, matrix, material 50. As stated, the article 47 was made by the present invention wherein the inner surface of the extrusion device was fitted with streamlined irregularities to cause displacement of an inner surface layer of the extruded blend of materials. Before stretching, matrix material 50 is thoroughly fused at knit line 48 to yield a seam of the matrix material. The knit line 48 is, however, curved at one end resulting in overlap of particles of incompatible polymeric material 49. By overlap, is meant that overlapping layers of the distributed material 49 will be included in any radial section through the wall of the article.

When the article 47 is stretched, the curved portion of the knit line 48 will stretch. Because, as noted above, particles of incompatible polymeric material 49 lend strength to the blend, the portion of the article 47 which is directly surrounding the curved end of knit line 48 will stretch at about the same rate and to about the same degree as portions of the article 47 located some distance from the knit line 48. On the other hand, the portion of the article 47 which is directly surrounding the undisturbed end of knit line 48 will stretch more and at a greater rate than other portions of article 47. Such greater degree of stretching causes some thinning and weakening of the wall of article 47 but the wall is not thinned or weakened in the areas wherein the knit line 48 has been curved and the particles of incompatible polymeric material 49 have been caused to overlap by the practice of the present invention.

FIG. 6 depicts a cross section of a laminar, molded, hollow article 52, of this invention, after the article has undergone stretching. An inset is drawn to show an exaggerated representation of a knit line or seam 53 in the article 52. Particles of incompatible polymeric material 54 are distributed in continuous matrix material 55 and the knit line 53 has been curved at both ends as a result of using an extrusion device having streamlined irregularities on both the inner and the outer surfaces to cause displacement of both surface layers of the extruded blend of materials. Because the knit line 53 is curved at both ends, particles of incompatible polymeric material 54 form overlapping layers and the overlapping layers increase the strength of the article and prevent thinning at the seam. Overlapping layers of particles of incompatible polymeric material 54 are included in any radial section through the wall of article 52. As a result of the practice of this invention, a molded article has a substantially uniform thickness from the knit line area to areas adjacent the knit line area.

The article of this invention includes a first polymer present as a continuous or matrix phase and a second polymer, incompatible with the first, present as a discontinuous phase. Also useful in the practice of this invention, is a polymer which is believed to adhere together adjacent layers or domains of the incompatible polymers. In view of its believed purpose, that polymer can be termed a compatibilizer; but the actual mechanism of its operation is not completely understood. It is believed that at least some of the compatibilizer is concentrated, in the laminar shaped article of this invention, between the adjacent layers of incompatible polymer joined partially with one layer and partially with an adjacent layer, thus adhering the layers together. Without the compatibilizer, shaped articles formed from heterogeneous melts of incompatible polymer sometimes have poor mechanical properties and, sometimes, cannot even be extruded or molded to yield unitary articles. For the purposes of this invention, "incompatible polymers" mean polymeric materials which have substantially no mutual miscibility in the melt form.

Although it is not required, it is preferred that the second polymer used in practice of this invention is, as stated, in particulate form; and it is desired that both, the first polymer and the second polymer should be mixed as particles. The particles should, as a general rule, be of a size, such that, the molten blend of incompatible polymers, when introduced to some melt stretching means, such as extrusion die lips, exhibits the heterogeneity necessary for practice of the invention. When the particles, especially particles of the second polymer, are of too small a size, the melted blend, even though not excessively mixed, tends to function as a homogeneous composition because the individual domains of material making up the discontinuous polymer phase are so small. When the particles, especially particles of the second polymer, are of too large a size, the melted blend tends to form into shaped articles having a marbleized structure rather than a laminar structure. The particles are preferably generally regular in shape, such as cubical or spherical or the like. The particles may, however, be irregular; and they may have one dimension substantially greater than another dimension such as would be the case, for example, when flakes of material are used.

When each of the incompatible polymers is present as individual particles, the particles are generally of approximately the same size although such is not required. The compatibilizer can be provided by itself as individual particles or it can be mixed into, coated onto, or otherwise combined with one or both of the incompatible polymers.

The thickness of the layers of material in the discontinuous phase is a function of the particle size combined with the degree of stretching in the forming step. The particle size of the polymer which will constitute the discontinuous phase is generally selected with a view toward resulting, after stretching, in overlapping layers which can be from about 0.5 to 50 micrometers thick and perhaps, sometimes slightly thicker.

Mixing particles of polymers can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand;—the only requirement of the mixing being that any two statistical samplings of the mixture in a given mass of material should yield substantially the same composition. The mixing of the incompatible polymers can be accomplished by adding particles of the higher melting polymer to a melt of the lower melting polymer maintained at a temperature below the higher melting point. In that case, the melt is agitated to obtain an adequate mixture; and the mixture is, thus, ready for the heating step.

Once mixed, the incompatible polymers are heated to a temperature greater than the melting point of the highest melting polymer component. It is noted that the heating is conducted for the purpose of stretching the softened or melted blend. In the case of an incompatible polymer which exhibits no well-defined melting temperature, "melting temperature", as used here, refers to a temperature at least high enough that the polymers have been softened to the degree required to stretch each of the polymers in the blend. That heating results in a softened or melted, heterogeneous blend of materials and the heating must be conducted in a manner which avoids substantial additional mixing of the incompatible polymers because such mixing could cause a homogenization and combination of the melted particles and could result in a melt and a shaped article of homogeneous, unlayered, composition. The heating can be conducted by any of several well-known means and is usually conducted in an extruder. It has been learned that a single-screw extruder of the type which is designed for material transport and not material mixing can be used between the heating and forming steps of this invention without causing homogenization of the two phase incompatible polymer composition. To the extent that the composition retains an aspect of heterogeneity, to that extent the process and the product of this invention can be realized.

The forming step requires stretching of the melted blend followed by cooling. Stretching is an elongation of the two phase melt to cause a substantial change in the dimensions of the particles in the discontinuous phase. Stretching can be accomplished by any of several means, or by a combination of more than one such means. For example, the melt can be stretched by being squeezed between rollers or pressed between platens or extruded between die lips. Molding processes such as blow molding also cause stretching in accordance with this process. In the manufacture of containers as shaped articles, the stretching can be accomplished by a combination of extruding a blend of the heterogeneous melt to yield a container preform or parison followed by blow molding the parison into a finished container.

The stretching can be in one direction or in two, preferably perpendicular, directions. Whether the stretching is conducted in one direction or two, there should be an elongation of from 100 to 2000 percent in at least one direction; and an elongation of from 100 to 1500 percent is preferred. While the upper limit set out herein is not critical, the lower limit is critical insofar as inadequate stretching does not yield the improved barriers to fluid permeation which characterize this invention. Avoidance of excessive stretching is important only insofar as excessive elongation of the melt may lead to weakening or rupture of the article.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As to the proportions of the components for practicing the invention, the incompatible, second, polymer which is to be a discontinuous phase in the shaped articles should be present in generally less than about 40 weight percent of the mixture. It has been found that the incompatible, second, polymer should be present in more than about 0.5 weight percent and less than about 40 weight percent of the mixture and about 2 to 20 weight percent is preferred. The continuous, first, polymer should be present in more than about 60 weight percent and less than about 99.5 weight percent of the mixture and 70 to 98 weight percent is preferred. The compatibilizer should be present in about 5 to 35 weight percent of the discontinuous phase and about 10 to 25 weight percent is preferred. Any of the components can be used to introduce inert fillers into the composition provided only that the fillers are not of a kind or in an amount which would interfere with formation of the layered construction or with the desired or required properties of the composition. Amounts of opacifiers, colorants, lubricants, stabilizers and the like which are ordinarily used in structural polymeric materials can be used herein. The amount of such filler is not included in the calculation of amounts of incompatible polymers and compatibilizers.

The first polymer, forming a continuous or matrix phase in the composition of this invention, can be any thermoplastic material having a melt viscosity, at forming and stretching temperatures, lower than the melt viscosity of the second polymer, described below. Polyolefins are preferred as the first polymers and preferred polyolefins are polyethylene, polypropylene, polybutylene, copolymers of those materials, and the like. Polyethylene is preferred and may be high, medium, or low density.

The second polymer, forming a discontinuous phase in the composition of this invention, can be any thermoplastic material having a melt viscosity at forming and stretching temperatures, higher than the melt viscosity of the first polymer, described above. Examples of second polymers which can be used in this invention are polyamides, polyvinyl alcohols, and olefin copolymers such as ethylene/vinyl alcohol, nitrile copolymers such as acrylonitrile/methylacrylate and styrene/acrylonitrile, polyvinylidene chloride, polycarbonates and other polyesters such as polyethylene terephthalate and polybutylene terephthalate, and the like. Polycondensation polymers such as polyamides and polyesters are preferred as second polymers.

The compatibilizer is a polyolefin which has carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers. Additional description of compatibilizers is found in U.S. Pat. No. 4,410,482.

DESCRIPTION OF THE PREFERRED EMBODIMENTS

Polyolefin, polyamide, and a compatibilizer were mixed to make a blend, parisons were extruded from the blend, and bottles were blow molded from the parisons. The parisons were extruded through heads with no streamlined irregularities, as a control, and through heads with streamlined irregularities such as are indicated in FIG. 3, as an example of this invention.

The polyolefin was a linear polyethylene having a density of 0.955 gram per cubic centimeter, a melt index of 0.35 as determined according to ASTM D-1238, and is commercially available from Phillips Petroleum Company under the trademark designation "Marlex" 5502. Particles of the polyamide and the polyethylene were generally disk-shaped and were about 3–4 millimeters in diameter.

The polyamide was prepared by condensing hexamethylene diamine, adipic acid, and caprolactam to obtain a composition of 80 weight parts of polyhexamethylene adipamide and 20 weight parts of polycaproamide. That polyamide exhibited a melting point of about 220° C.

The alkylcarboxyl-substituted polyolefin compatibilizer was obtained by melt grafting fumaric acid onto polyethylene having a density of 0.958 gram per cubic centimeter and a melt index of about 10, as determined according to ASTM D-1238. The fumaric acid was grafted onto the polyethylene in an amount of about 0.9 weight percent based on the total weight of the polymer in accordance with the teaching of U.S. Pat. No. 4,026,967. Particles of the compatibilizer were generally cubical and were about 2–3 millimeters on a side. The material exhibited a melting point of about 135° C.

The mixture was tumbled in a drum to achieve complete, even, particle distribution and was then fed directly into an extrusion blow molding machine such as that sold by Rocheleau Tool & Die Co., Inc., of Fitchburg, MA, U.S.A., identified as Model R7A and equipped with a low mixing screw and tooling. In initial operations, the mandrel and extrusion head of the extrusion device were smooth, and bottles made using those elements were tested as comparative examples. To make the articles of this invention, the smooth-walled extrusion head was exchanged for a head having 8 ridges, ⅛ inches high and fixed at a spiral angle of about 45 degrees from the vertical equally spaced around the upper, cone-convergent, area as shown in FIG. 3. The converged throat of the extrusion was about 1.5 centimeters in diameter.

Bottles with a capacity of about 900 milliliters (quart) were blow molded at an extrusion temperature of about 230° C.

As controls, bottles of pure polyethylene (HDPE in Table, below) were, also, blow molded in sizes and using equipment as will be described below. The mixture of polymers used in these examples was about 85 weight percent polyethylene, 12.5 weight percent polyamide, and 2.5 weight percent compatibilizer (INV in Table, below).

Bottles were tested for permeation and crop height.

The permeation test provides indication of the containing quality of bottle walls. The permeability test is conducted in accordance with ASTM D-2684-73R79 wherein bottles are filled to 20 percent of their volume with xylene and are stored in circulating-air ovens at 60° C. and weighed periodically to determine xylene loss from the bottles. The weight loss is plotted against time and, from that plot, the rate of loss (R) is determined. The permeability factor (P) is determined from the following equation:

$$P = RT/A$$

wherein
R is the rate of loss as above-noted;
T is the average bottle wall thickness; and
A is the bottle surface area.

The drop height test provides indication of wall strength in blow molded containers. The drop height test is conducted in accordance with ASTM D-2463-74R83 wherein bottles filled with water are dropped to a solid flat floor surface in an order which involves decreasing the drop height by 0.3 meters after each fall which results in failure and increasing the drop height by 0.3 meters after each fall where the dropped bottle does not fail. The first drop is made from about the expected height of failure and the mean failure drop height is calculated from a total testing of twenty dropped bottles.

The mean failure drop height can be calculated as follows:

$$h = h_o + d[(A/N) \pm \tfrac{1}{2}]$$

wherein
- h = mean failure drop height
- d = increment in height of drop
- N = number of failures or nonfailures, whichever is lesser.
- $h_o$ = lowest height at which any of N occurs.
- $A = (dh_1)(n_1) + (dh_2)(n_2) + \ldots (dh_i)(n_i)$
- $dh_i$ is the number of increments apart from the height of $h_o$ and $n_i$ is the number of failures or nonfailures occurring at $dh_i$.

When failures are counted, the negative ½ is used. For counting nonfailures, the positive ½ is used.

Results are shown in the Table, below.

| Example | I | II | 1 |
|---|---|---|---|
| Head | Smooth | Spiral | Spiral |
| Material | INV | HDPE | INV |
| Bottle wt. (gm) | 63.3 | 61.8 | 60.7 |
| Permeation* | 4.11 | 176 | 1.26 |
| Drop Height (m) | 1.58 | 5.49 | 3.20 |

*Units for permeation are gram-mils per day-100 square inches.

It should be noted that Example I is useful as a comparison between bottles made using a smooth extrusion head and bottles made using a spiral head in accordance with this invention. Example II is useful as a comparison between bottles made using high density polyethylene (HDPE) and bottles made using the combination of component materials in accordance with this invention. Example 1 is data from testing bottles made in accordance with this invention.

What is claimed is:

1. A process for manufacturing a laminar, molded, hollow, article of polymeric material comprising the steps of: (i) establishing a molten, heterogeneous, blend of a first polymer component and a second polymer component imcompatible with the first by heating the blend above the melting point of the highest melting polymer component; and (ii) molding the melted blend to have a knit line curved through the thickness of the article resulting from such molding by (a) extruding the body of the melted blend through a die wherein internal surfaces of the die have streamlined irregularities positioned to displace surface material of the melted blend relative to core material of the melted blend and (b) cooling the extruded body to below the melting point of the lowest melting polymer component.

2. The process of claim 1 wherein the first polymer component is a polyolefin.

3. The process of claim 1 wherein there is also included an alkylcarboxyl-substituted polyolefin as a compatibilizer.

4. The process of claim 1 wherein the extruded material of step (a) is blow molded into the shape of a bottle before the cooling of step (b).

5. The process of claim 4 wherein the blow-molded bottle has a substantially uniform wall thickness from the knit line area to areas adjacent the knit line area.

6. The process of claim 1 wherein the first polymer component is present in the molten blend as a continuous matrix phase and the second polymer component is present in the molten blend as a discontinuous phase.

7. The process of claim 2 wherein the second polymer component is a condensation polymer.

8. The process of claim 7 wherein the condensation polymer is a polyamide or a polyester.

9. The process of claim 7 wherein the polyolefin is selected from the group consisting of polyethylene, polypropylene, polybutylene, and copolymers of those materials.

* * * * *